Dec. 18, 1956     F. E. GILMORE     2,774,715
AUTOMATIC CONTROL OF REBOILER ON DEETHANIZING ABSORBER
Filed Aug. 25, 1952
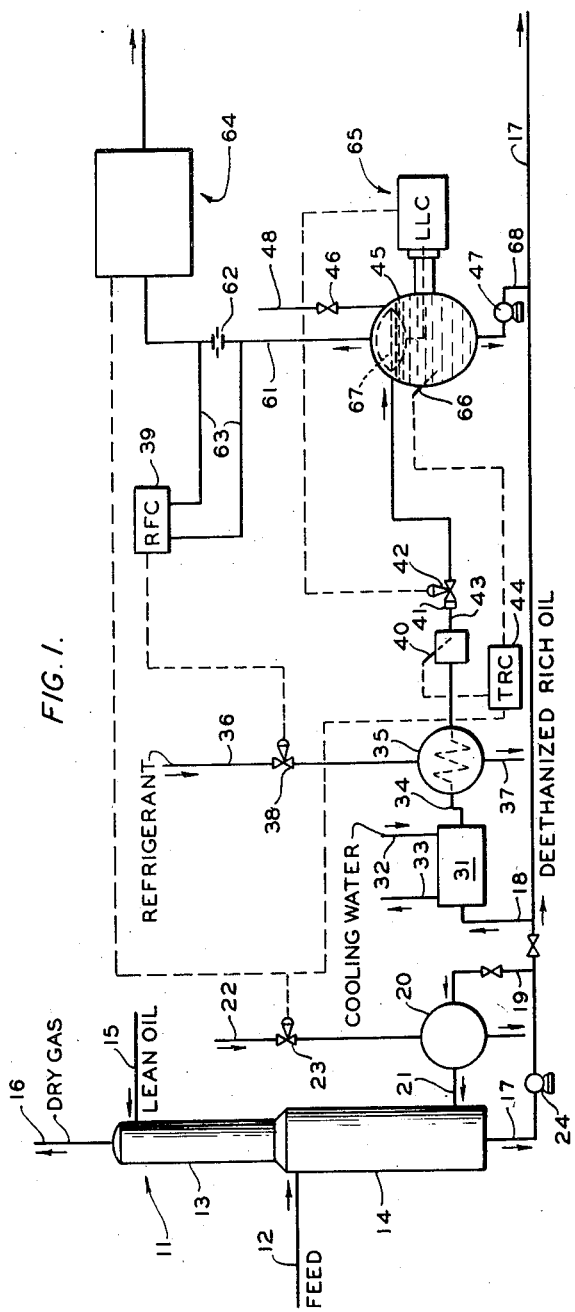
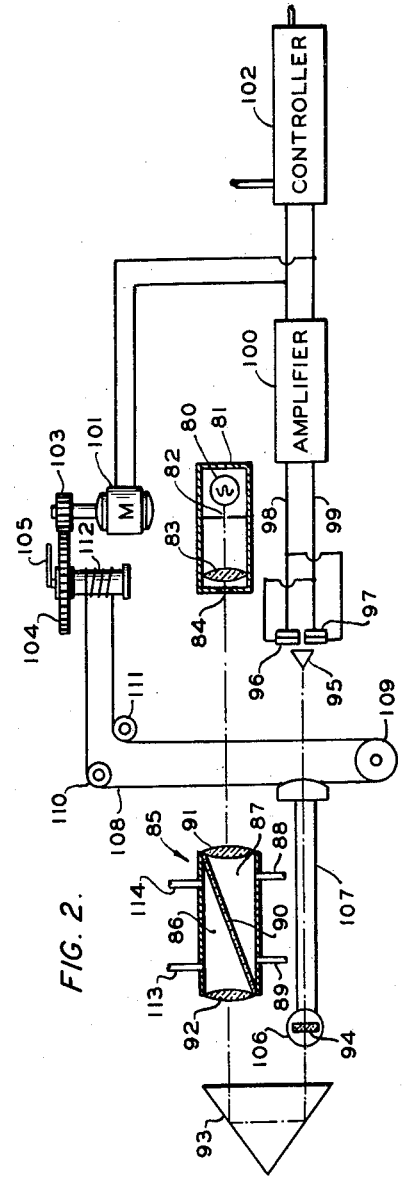
*INVENTOR.*
F. E. GILMORE
BY
ATTORNEYS

United States Patent Office 2,774,715
Patented Dec. 18, 1956

2,774,715

AUTOMATIC CONTROL OF REBOILER ON DEETHANIZING ABSORBER

Forrest E. Gilmore, Bartlesville, Okla., assignor to Phillips Petroleum Company, a corporation of Delaware Application August 25, 1952, Serial No. 306,265

10 Claims. (Cl. 196—8)

This invention relates to fractionator control. In one aspect it relates to automatic control of the addition of reboiling heat to the kettle section of a fractional distillation column. In another aspect it relates to deethanizing absorber control.

My invention provides an improved means for the control of any continuous fractional distillation system which is reboiled and in which there is a relatively difficult separation to be made between the lowest boiling component and the next lowest boiling component of the bottoms product stream. It is also applicable to a continuous flash or equilibrium distillation, and in this case heat to the incoming feed may be controlled by the apparatus or the flash pressure may be controlled. As intended herein the term fractional distillation includes a reboiled absorption operation, stripping, reboiled extractive distillation, reboiled azeotropic distillation so long as no azeotrope is formed in the reboiler, as well as simple fractional distillation.

For exemplary purposes I will describe the principles and details of my invention as applied to a deethanizing-absorption operation.

The proper control of reboiler heat to a deethanizing absorber by means of temperature control alone is very difficult unless the propane and higher boiling hydrocarbon contents of the rich oil are constant. In actual practice too much heat is ordinarily applied to the reboiler in an attempt to insure complete deethanizing of the rich oil. This operation results in partial depropanizing of the oil and a decrease in the $C_3$ hydrocarbon recovery, especially propylene when the process is applied to a vapor recovery system involving treatment of cracking still gases. Efficient control of a deethanizing absorber might even permit avoidance of the use of a propane deethanizer and would recover additional $C_3$ hydrocarbon, especially propylene. In case a rich natural gas is treated in an absorber the rich absorption oil would of course not contain propylene but my operation is equally applicable to a rich absorption oil resulting from the treatment of a rich natural gas.

One of the difficulties encountered in operating a deethanizing absorber is when reboiling heat is controlled in response to reboiler temperature too much reboiling heat is ordinarily added. In deethanizing operations it is of course desirable to eliminate from the absorption oil all ethane if possible with as little loss of propane as possible. It is very difficult to make a clean cut between these two hydrocarbons. In practice it has been found more difficult to make a clean cut between two low boiling hydrocarbons than between two high boiling hydrocarbons even though the difference of boiling points is greater. When operating a deethanizing reboiler it is practically impossible to eliminate all of the ethane without losing a prohibitive amount of propane. Best operation on a plant scale is to permit the retention of a small amount of ethane in the kettle liquid so as not to lose excessive amounts of propane in the dry overhead gases, which normally are recycled to gas producing formations, to fuel or to utility pipe lines. When a small percentage, for example, one-half to one percent of ethane remains in the deethanizer bottoms ordinarily analytical instruments fail to detect the ethane in such a manner as to permit operation of control apparatus. For example, infra red and ultra violet analyzers do not detect small concentrations of ethne in the presence of propane and similar low boiling hydrocarbons. In like manner such apparatus as gravitometers and calorimeters do not function to detect small changes in ethane content in presence of large concentration of $C_3$ hydrocarbons.

According to my invention I have devised a process for carrying out such deethanizing operations wherein such apparatus as gravitometers, calorimeters, refractometers or even simple thermocouples may be used to control the efficient addition of reboiling heat to deethanizer column kettles. I have found that when a very small stream of a deethanizing column kettle product is cooled to a relatively low temperature and flashed at this low temperature that the ethane content of the flash vapors is ordinarily sufficiently high that such analytical apparatus as gravitometers, calorimeters and refractometers may be used. Thus, I divide the kettle product into two portions, one of which is a very small fraction of a total stream, i. e., for example, one fourth to one half percent of the total stream. Deethanizing absorbers are frequently operated with a kettle temperature between about 150 and 400° F. I cool the small fraction of such a bottoms to such a temperature that when the pressure is reduced in a flashing operation the ethane content tends to concentrate itself in the flashed vapors. When the ethane concentration has been so increased such analytical instruments as mentioned above can be used for controlling the reboiling heat in response to the specific gravity, calorific value or refractive index of the flashed gases. In order to provide an accurate control I regulate this flashing operation in such a manner as to produce the flashed gas at a constant rate. The constantly produced flash gases then serve for use in a gravitometer, calorimeter or refractive index apparatus for controlling the heat to the deethanizing kettle.

I also find that upon adjusting the temperature of the small fraction of deethanizer bottoms prior to flashing, to produce a constant flow of flash gases, that the temperature of the bottoms prior to flashing may be used with a temperature recorder controller apparatus for controlling the heat to the reboiler. Alternately, the temperature of the liquid after flashing may be used with a temperature recorder controller for regulating the heat to the reboiler.

In the flashing operation according to my invention it is preferable to flash only a relatively small proportion of the liquid in order to produce flashed vapors high in ethane content. When flashing about 2 mol percent or less I find that the ethane concentration is markedly increased in the flash vapors. By carrying out this flashing operation at a relatively low temperature the ethane concentrations in the flash vapors is higher than when the flashing is carried out at a higher temperature.

An object of my invention is to devise an efficient process for controlling the heat to a deethanizer reboiler.

Another object of my invention is to provide a method for controlling the addition of reboiling heat to a fractionator kettle so as to avoid addition of excessive heat with subsequent loss of $C_3$.

Still another object of my invention is to provide a method for controlling the addition of heat to a deethanizer reboiler so as to produce a deethanizer bottoms of minimum ethane content.

Still another object of my invention is to provide a method for controlling the addition of reboiling heat to a deethanizing kettle wherein the reboiler heat is added in response to the ethane content of the kettle product.

Still other objects and advantages will be realized upon reading the following disclosure which taken with the attached drawing forms a part of this specification.

In the drawing,

Figure 1 is a diagrammatical representation of one form of apparatus for carrying out the process of my invention.

Figure 2 is a diagrammatical representation of a portion of apparatus illustrated in Figure 1.

Referring now to the drawing and specifically to Figure 1 reference numeral 11 identifies a deethanizing absorber. The upper portion 13 of this deethanizer is termed an absorber or absorbing section, while element 14 is the lower or deethanizing section. A conduit 12 is attached to some intermediate point near the middle vertically of the vessel for introduction of feed stock. A line 16 is attached to the vessel for withdrawing overhead gaseous product while a line 15 is for introduction of lean absorption oil. A line 17 attached to the bottom of the deethanizing section is for removal of bottoms product, which in the case of a deethanizer, is a deethanized rich oil. Element 20 is a heat exchanger while a line 19 connects line 17 with the heat exchanger and a line 21 connects the heat exchanger with the kettle section of the vessel 11. A line 18 connects line 17 with a cooler 31. A line 34 connects this cooler with a heat exchanger 35. A line 43 containing a thermocouple 40, a sediment and scale separator 41 and a throttle valve 42 connects the heat exchanger 35 with a vessel 45. The cooler 31 is provided with a coolant inlet line 32 and an outlet line 33. The exchanger 35 is provided with a refrigerant inlet line 36 containing a throttle valve 38, and a refrigerant outlet line 37.

The vessel 45 contains a float 67 which is operatively connected with a controller apparatus 65 which in turn is connected to the throttle valve 42 for its operation. The bottom of the float vessel 45 is connected to conduit 17 with a tube 68 carrying a pump 47. The upper portion of the vessel 45 is provided with a tube 48 carrying relief valve 46.

Connected to the top of the float vessel 45 is a tube 61 carrying an orifice plate assembly 62 or equivalent flow measuring means. The other end of this tube 61 is connected to an analyzer apparatus 64 which will be described hereinafter. On either side of the orifice assembly 62 tube 61 is connected by tubes 63 to a rate of flow controller apparatus 39. The flow controller 39 is connected operatively, as shown, to the throttle valve 38.

Into one side of the float vessel 45, as shown, is inserted a thermocouple 66 which is connected operatively to a temperature-controller 44. This temperature controller 44 is connected operatively as shown to the thermocouple 40 in conduit 43 and to a throttle valve 23 in a line 22. The analyzer 64 is also connected as shown to operate the throttle valve 23. The float vessel 45 and parts connected thereto should be well protected with thermal insulation.

In the operation of my process a stock, such as a rich oil resulting from the absorption of a rich natural gas in an absorption oil, a rich oil resulting from the absorption of refinery gases such as rich gases from a crude distillation unit or gases from a cracking still, is introduced into the vessel 11 through the feed line 12. Into the upper portion of the absorber section (13) of vessel 11 is introduced a lean absorption oil through the line 15. Bottoms material is removed from the kettle of the deethanizing section 14 through the line 17 under the influence of pump 24. A portion of this bottoms material is passed through line 19 and heated in the exchanger 20 and passed on through line 21 into the kettle. This portion of the apparatus constitutes the reboiler. Steam from a source, not shown, is passed through the line 22 and control valve 23 into the exchanger 20.

The operation of the deethanizing absorber is more or less conventional as regards lean oil and rich gas introduction, overhead gas removal and kettle product removal. My invention provides a new and novel method of controlling the reboiling heat addition to the column.

To practice my invention, a very small fraction, usually amounting to well less than 1 percent of the kettle product flowing through line 17 is by-passed therefrom through line 18. Since this kettle product is withdrawn at a temperature varying from, for example, 150° to 400° F., this small fraction of rich oil is cooled in the cooler 31. The coolant for this cooler may be water. Thus, water from a source, not shown, is introduced into the cooler through line 32 and is removed through line 33. The cooled oil is removed from this water cooler through the line 34 and is passed to the refrigerated cooler 35 which should be cooled by a refrigerant such as butane. When butane is used for the refrigerant, the refrigerant is passed from a source, not shown, through the line 36 and throttle valve 38 into the exchanger 35. Used refrigerant is removed from the exchanger through the line 37 for passage to the compressor of the refrigeration system. Chilled rich oil is passed from the exchanger 35 through line 43 carrying the thermocouple 40, the sediment and scale remover 41 and the throttle valve 42, into the float chamber 45. Since a pressure reduction is experienced on passing through the throttle valve 42 flashing occurs with phase separation occurring in the vessel 45. Liquid is withdrawn from vessel 45 at a constant rate through line 68 as by constant discharge pump 47. The float 67 cooperating with the controller 65 operates to control the flow of refrigerated rich oil into the vessel 45 so as to maintain a constant or substantially constant level of liquid therein. The flashed gases from the top of the vessel 45 are removed through the line 61 and are passed through the orifice assembly 62 into the analyzer 64. The orifice plate of the orifice assembly 62 contains a very small orifice or opening, which small opening is intended for the passage of a relatively small volume of gas. The tubes 63, one of which is connected upstream of the orifice and the other downstream thereof are for transmitting pressure differential through the orifices to the flow controller 39. This latter controller is so constructed that it opens somewhat the throttle valve 38 when the flow of gas increases through the orifice 62. Conversely this flow controller 39 also throttles valve 38 when the flow of flashed gas through orifice 62 diminishes below a predetermined value. This assembly is intended to provide as nearly as possible a constant flow of gas through line 61.

In case the level of the flashed liquid in vessel 45 drops below a predetermined level for any reason whatever, the liquid level controller apparatus 65 operates the throttle valve 42 to increase the flow of refrigerated rich oil entering the float chamber 45. When the level of the flashed liquid in chamber 45 reaches its preselected point the controller apparatus 65 operates to throttle the valve 42 so as to maintain as nearly as possible a constant liquid level.

In another embodiment of my invention when the vapors are produced at a constant rate, as hereinabove explained, the temperature of the rich oil flowing through line 43 may be detected by thermocouple 40 which cooperates with the temperature controller 44 for controlling the flow of steam to the reboiler of the column 11. When the rich oil bottoms from the reboiler contains too great an ethane content, the volume of flashed gases passed through line 61 tends to be too great and the rate of flow controller 39 operates to open somewhat the throttle valve 38. The opening of throttle valve 38 adds more refrigerant to the exchanger 35 resulting in a lowering of the temperature of the rich oil leaving this exchanger. This lowering of temperature is indicated by the thermocouple 40 and in cooperation with the temperature recorder controller 44 the throttle valve 23 is opened somewhat to admit more steam to the reboiler of the vessel 11 so as to strip out more of the ethane content of the bottoms. Conversely, when too little gas is flashed in vessel 45 the rate of flow controller operates to throttle the valve 38. This operation supplies less refrigerant to the exchanger 35 which operation permits a rise of temperature of the rich oil flowing through line 43. Thus the rich oil enters the flash chamber 45 at a higher temperature, which higher temperature, is conducive to the flashing of an increased volume of gas. The increased temperature of rich oil flowing through line 43 is detected by the thermocouple 40 which in cooperation with the temperature controller 44 operates to open to a greater extent the throttle valve 23 and admit more steam to the reboiler of column 11.

In like manner the temperature of the liquid remaining from the flashing operation in vessel 45 if detected by thermocouple 66 may be used for control of the throttle valve 23. As the temperature of the liquid in vessel 45 changes the temperaure controller 44 in cooperation with the thermocouple 66 operates the throttle valve 23 to increase or decrease the flow of steam to the reboiler as more stripping or less stripping is needed.

Back pressure on the sampling system is maintained constant by means (not shown) disposed in conduit 61 at some point between analyzer 64 and the point at which the one conduit 63 (downstream of orifice 62) joins line 61.

The flashed gases flowing through the tube 61 ultimately enter the analyzer 64. This analyzer 64 may be a gravitometer-controller, a calorimeter-controller, or a differential refractometer depending upon the vapors or gases to be analyzed. These instruments may be recording instruments if desired. Since controlling gravitometers and controlling calorimeters are well known apparatus obtainable from instrument supply houses the construction and detailed operation of these controllers will not be described herein.

When a gravitometer-controller is used the operation is such that when the gravity of the vapor flowing through the line 61 increases, the supply of heat to the column's reboiler is reduced by throttling somewhat the valve 23 to the flow of steam.

When the analyzer 64 is a recorder-calorimeter, this apparatus operates to reduce the heat supplied to the reboiler when the heat of combustion of the vapors flowing through line 61 increases above a predetermined B. t. u. content per cubic foot.

A mass spectrometer adapted for determining the ethane or C₂ hydrocarbon content of a gas may be used for controlling the flow of steam to the reboiler. Upon increase of the ethane content of the flash gas to a point above a predetermined value the apparatus operates to reduce the flow of steam to the reboiler and upon decrease of the ethane content below the predetermined value, the spectrometer apparatus operates to permit flow of more steam.

Likewise, when the analyzer 64 is a differential refractometer this apparatus operates to throttle the flow of steam to the reboiler upon an increase of the refractive index of the composite flashed gases flowing through line 61 into the refractometer.

Since differential refractometers are not generally available from instrument supply houses I will describe a differential refractometer which is suitable for use in analyzing the gases flowing through line 61. In Figure 2 of the drawing is illustrated in diagrammatic form one form of differential refractometer which may be used in the operation of my invention.

Referring specifically to Figure 2 this refractometer comprises a source of light 80 mounted in a housing 81. Source 80 can be an ordinary incandescent bulb emitting radiation in the visible spectrum. Radiation emitted from source 80 passes through a baffle 82 and is focused by a lens 83 on a lens 91. An aperture between these two lenses is positioned at the principal focus of the lens 91. This arrangement provides a parallel beam of radiation from aperture 84 through refractometer cell 85. This parallel beam of light is then focused by a lens 92 on the apex of a prism 95. Cell 85 includes a first chamber 86 supplied with an inlet conduit 113 and an outlet conduit 114 through which a sample of the flashed gas from line 61 of Figure 1 is passed. Cell 85 also includes a second chamber 87 provided with an inlet conduit 88 and a outlet conduit 89 which are adapted for filling chamber 87 with a standard fluid having a predetermined refractive index approximating that of the flashed gas sample circulated through chamber 86. Chambers 86 and 87 are separated by a diagonal transverse plate 90 constructed of a material, such as glass, which is transparent to the light beam from source 80. The converging lens 91 defines one opening of chamber 87 and the second converging lens 92 defines a corresponding opening of chamber 86. The components thus far described are arranged such that aperture 84 is at the principal focus of lens 91. In this manner a narrow beam of parallel light enters chamber 87 and emerges from chamber 86 through lens 92 after passing through the diagonal plate 90. The light beam emerging from lens 92 enters a glass prism 93 disposed in such a manner that its front surface is perpendicular to the path of light. The light beam is twice reflected in prism 93 and emerges therefrom to pass through a rotatable block of glass 94 having its two surfaces substantially perpendicular to the path of radiation. From glass block 94 the light beam passes through a second prism 95 disposed such that the light beam normally strikes the apex in a line perpendicular to the prism base. A radiation detector unit, comprising first and second photo voltaic cells 96 and 97 is positioned such that the light beam striking the apex of prism 95 normally impinges equally upon the adjacent positioned cells 96 and 97. The outputs of these cells are connected in opposition by means of electrical leads 98 and 99 so as to produce a resulting voltage proportional to the difference in total radiation incident upon the two cells. The voltage appearing between leads 98 and 99 is amplified by an amplifier 100, the output of which is applied to both a reversible motor 101 and a controller 102. Controller 102 preferably includes a rectifier for rectifying the alternating current signal from amplifier 100 to power a direct current motor usually provided in such a controller as controller 102. The controller 102 can be a conventional instrument which provides an output air pressure representative of an electrical signal applied thereto. This air pressure actuates the throttle valve 23 of Figure 1. The shaft of motor 101 carries a gear 103 which engages a second gear 104. The gear 104 carries a pointer 105 mounted to indicate the degree of rotation of motor 101 produced by the output electrical signal from amplifier 100. The glass block 94 is mounted centrally on a rotatable base 106 having a pivot point at its center. The base 106 is provided with an arm 107 which is attached to a cable 108. The cable 108 passes about suitable support posts 109, 110 and 111 and is wrapped about the shaft 112 of gear 104. Thus, the rotation of gear 104 in response to the output signal from amplifier 100 moves the cable 108 in such a manner as to rotate the glass block about its mid point.

If the refractive indices of the gases contained in chambers 86 and 87 are equal the light beam emerging from the cell 85 is in optical alignment with the light beam entering this cell 85. The apparatus is initially positioned such that undeviated light beam strikes the apex of the prism 95 and is directed in equal intensities upon the cells 96 and 97. However, should the refractive indices of the two gases differ from one another the emerging light beam is deviated in one direction or the other by cell 85 in such a manner that a greater intensity of radiation is incident upon either cell 97 or cell 96. This in turn causes an unbalanced voltage, which after amplification, drives motor 101. The rotation of motor 101 in turn drives shaft 112 to rotate the glass block 94 through the connecting linkage cable 108. This rotation of block 94 is such as to deviate the light beam in the opposite direction and continue as long as unequal intensities of radiation are incident upon cells 96 and 97. The degree of this rotation, as indicated by pointer 105, is the measure of the difference in refractive indices between the two gases in the cell 85. The electrical signal from the amplifier 100 also adjusts the output air pressure from the controller 102. This output air pressure from controller 102 opens somewhat or throttles the motor valve 23 as previously described.

In flashing of the cooled rich absorption oil I prefer to carry out the flashing operation at a relatively low temperature in order to concentrate the ethane as much as possible in the flashed vapors. Such temperature may be between the limits of $-25°$ to $150°$ F., preferably between $0°$ F. and $100°$ F. Based on the equilibrium constants of ethane and propane it will be realized that this flashing operation should be carried out at as low a temperature as practical in order to concentrate the ethane as much as possible in the vapors. Pressure may be about atmospheric or slightly above. A vacuum system will need to be used in case it is desired to maintain a pressure less than atmospheric in the flash vessel 45.

The above description of the operation of the differential refractometer was given without consideration as to whether the "unknown gas" or "reference gas" was a single gas or a mixtures of gases. When used in such a process as therein described, the reference gas may be almost any gas or mixture of gases having a predetermined index of refraction. The gas used as a reference gas may be a mixture of ethane and propane which possesses the index of refraction of the flashed gas passing through tube 61 containing a maximum permissible ethane content. When the reference cell is so filled, and a flashed gas passes through the other cell, the differential refractometer operates to throttle the steam to the reboiler when the index of refraction of the mixture of gases rises above the index of refraction of the reference gas and vice versa, upon decrease of the index of refraction of the flashed gas below the index of refraction of the reference gas, the refractometer operates to open somewhat the valve controlling the flow of steam to the reboiler.

The following data are exemplary of the principles upon which my invention is based:

EXAMPLE 1

*Composition of the ethane-free rich oil*

| Hydrocarbon: | Mol percent |
|---|---|
| $C_3$ | 8.5 |
| $C_4$ | 18.3 |
| $C_5+$ | [1]73.2 |

[1] This value averages about $C_8$ and includes the absorption oil.

EXAMPLE 2

*Flash equilibrium of rich deethanized oil at $100°$ F. and 15 p. s. i. a.*

Assume $\frac{L}{V} = 10.0$

| H. C. | $100°$ F. K 15 p. s. i. a. | $f$, Mol Percent | $\frac{L}{KV}+1$ | V | V, Mol Percent | Sp. Gr. of Fract. | Product |
|---|---|---|---|---|---|---|---|
| $C_3$ | 10.5 | 8.5 | 1.952 | 4.35 | 47.5 | 1.522 | .723 |
| $C_4$ | 3.3 | 18.3 | 4.03 | 4.54 | 49.6 | 2.006 | .995 |
| $C_5+$ | .038 | 73.2 | 273.0 | .27 | 2.9 | 3.944 | .116 |
|  |  | 100 |  | 9.16 | 100 |  | [1]1.834 |

$$\frac{L}{V} = \frac{100 - 9.16}{9.16} = \frac{90.84}{9.16} = 9.93 \text{ (approx. 10)}$$

[1] Sp. gr. of vapor.

EXAMPLE 3

*Flash equilibrium of rich deethanized oil $+1\%$ ethane at $100°$ F. $+15$ p. s. i. a.*

Assume $\frac{L}{V} = 8.0$

| H. C. | $100°$ F. K 15 p. s. i. a. | $f$, Mol Percent | $\frac{L}{KV}+1$ | V | V, Mol Percent | Sp. Gr. of Fract. | Product |
|---|---|---|---|---|---|---|---|
| $C_2$ | 32.0 | 1.0 | 1.25 | 0.800 | 7.2 | 1.038 | .0746 |
| $C_3$ | 10.5 | 8.4 | 1.762 | 4.770 | 42.7 | 1.522 | .6500 |
| $C_4$ | 3.3 | 18.0 | 3.425 | 5.250 | 47.1 | 2.006 | .9460 |
| $C_5+$ | .038 | 72.6 | 211 | .344 | 3.0 | 3.944 | .1180 |
|  |  | 100 |  | 11.164 | 100 |  | [1]1.7886 or 1.789 |

$$\frac{L}{V} = \frac{100 - 11.164}{11.164} = 7.97 \text{ (approximately 8)}$$

[1] Sp. gr. of vapor.

EXAMPLE 4

*Flash equilibrium of rich deethanized oil at 75° F. and 15 p. s. i. a.*

Assume $\frac{L}{V}=60.0$

| H. C. | 100° F. K 15 p. s. i. a. | f, Mol Percent | $\frac{L}{KV}+1$ | V | V, Mol Percent | Sp. Gr. of Fract. | Product |
|---|---|---|---|---|---|---|---|
| C₃ | 7.6 | 8.5 | 8.89 | .956 | 58.2 | 1.522 | 1.448 |
| C₄ | 2.3 | 18.3 | 27.50 | .665 | 40.5 | 2.006 | 1.335 |
| C₅+ | .017 | 73.2 | 3,536 | .021 | 1.3 | 3.944 | .083 |
|  |  | 100 |  | 1.642 | 100 |  | ¹2.866+1.642= 1.748 |

$$\frac{L}{V}=\frac{100-1.642}{1.642}=\frac{98.358}{1.642}=59.8 \text{ (approx. 60)}$$

¹ Sp. gr. of vapor.

EXAMPLE 5

*Flash equilibrium of rich deethanized oil plus 0.25 mol percent C₂ at 75° F. and 15 p. s. i. a.*

Assume $\frac{L}{V}=36$

| H. C. | 75° F. K 15 p. s. i. a. | f, Mol Percent | $\frac{L}{KV}+1$ | V | V, Mol Percent | Sp. Gr. of Fract. | Product |
|---|---|---|---|---|---|---|---|
| C₂ | 26 | 0.25 | 2.385 | 0.1048 | 3.9 | 1.038 | 0.1088 |
| C₃ | 7.6 | 8.48 | 5.740 | 1.4800 | 54.5 | 1.522 | 2.2540 |
| C₄ | 2.3 | 18.26 | 16.660 | 1.0960 | 40.3 | 2.006 | 2.2000 |
| C₅+ | .017 | 73.01 | 2,120 | .0344 | 1.3 | 3.944 | 0.1358 |
|  |  | 100 |  | 2.7152 | 100 |  | ¹4.6986+2.7152= 1.730 |

$$\frac{L}{V}=\frac{100-2.7152}{2.7152}=35.9 \text{ (approximately 36)}$$

¹ Sp. gr. of vapor.

*Note.*—Comparing vapor flashed in (4) with (5), 65% more is flashed at the same temperature and pressure when only 0.25% of ethane is added.

EXAMPLE 6

*Flash equilibrium of rich deethanized oil plus 0.25 mol percent C₂ at a low enough temperature so same mol percent is flashed as for the oil without ethane as in (4), i. e., 1.642% flashed*

$\frac{L}{V}=60$ determine temp., mol percent flashed and sp. gr. of vapor

| H. C. | 71° F. K 15 p. s. i. a. | f, Mol Percent | $\frac{L}{KV}+1$ | V | V, Mol Percent | Sp. Gr. of Fract. | Product |
|---|---|---|---|---|---|---|---|
| C₂ | 24.96 | 0.25 | 3.407 | 0.0733 | 4.47 | 1.038 | 0.0760 |
| C₃ | 7.28 | 8.48 | 9.245 | 0.9170 | 55.47 | 1.522 | 1.3970 |
| C₄ | 2.15 | 18.26 | 28.180 | 0.6480 | 39.11 | 2.006 | 1.3020 |
| C₅+ | .013 | 73.01 | 4,620 | 0.0158 | 0.95 | 3.944 | 0.0624 |
|  |  | 100 |  | 1.6541 | 100 |  | ¹2.8374+1.6541 =1.715 |

V at 71° is 1.6541 mol percent of feed which is about 0.5 percent higher than for flash without any C₂ in the oil. K's used are comparable. Actual temperature would be between 70 and 71° F. or between 4 and 5° F. lower than when no ethane is present. The specific gravity of the flashed vapor would be about .033 lower than when no ethane is present. The temperature of the flashed liquid to control reboiler heat will be very satisfactory. However, with a much smaller flash which will be possible with this mechanism, the differences in specific gravity of the flashed vapors will be much greater and thereby a more advantageous means of control. For the flash at 71° F. above the mol percent of ethane in the flash is almost 18 times as great as in the liquid flashed.

¹ Sp. gr. of vapor.

Such auxiliary apparatus as pumps, valves, pressure gages and controllers and the like are not shown on the drawing nor described in the specification for purposes of brevity. The need for such apparatus is well understood by those skilled in the art. Valves, controls and the like which are necessary for practicing the process of my invention are fully disclosed herein.

While I have described my process as applied to a deethanizing operation it is equally applicable to a depropanizing or a debutanizing operation. While the above process and apparatus diagrams have been described for illustrative purposes, the invention obviously is not limited thereto.

Having described my invention, I claim:

1. A process for operating a deethanizing still comprising introducing a rich absorption oil comprising absorbed $C_2$ hydrocarbons, methane, $C_3$ and higher boiling hydrocarbons into a deethanizing still, removing gaseous effluent overhead from said still as one product of the process, adding reboiling heat to the liquid contents of the kettle section of said still to promote deethanizing reboiling, withdrawing kettle product, dividing the withdrawn material into two portions, removing one portion as the main product of the process, cooling the other portion sufficiently to concentrate said $C_2$ hydrocarbons in the flash vapors as subsequently produced, reducing the pressure of the cooled portion in a flashing operation whereby said flash vapors comprising ethane are evolved from residual liquid, controlling the degree of cooling of said other portion in direct response to the rate of evolution of the flashed gases and in an amount sufficient to produce the flashed gas at a constant rate, and regulating the addition of said reboiling heat to the liquid contents of the kettle section of the still in direct response to the $C_2$ hydrocarbon content of the evolved gas, the addition of said reboiling heat being sufficient to operate said deethanizing still.

2. A process for operating a deethanizing still comprising introducing a rich absorption oil comprising absorbed $C_2$ hydrocarbons, methane, $C_3$ and higher boiling hydrocarbons into a deethanizing still, removing gaseous effluent overhead from said still as one product of the process, adding sufficient reboiling heat to the liquid contents of the kettle section of said still to promote deethanizing reboiling, withdrawing liquid from the kettle section from said still, dividing the withdrawn material into a first and second portion, removing the first portion as the main product of the process, cooling the second portion of withdrawn material sufficiently to concentrate said $C_2$ hydrocarbons in the flash vapors subsequently produced, reducing the pressure of the cooled second portion of withdrawn material in a flashing operation to produce said flash vapors rich in ethane, regulating the degree of said cooling of said second portion of withdrawn material to produce said flash vapors at a predetermined constant rate and regulating the reboiling heat to the liquid contents of the kettle section of said still in response to a measurable property of a component of said cooled second portion of withdrawn material that is indicative of the $C_2$ content of the flash vapor selected from the group consisting of the specific gravity of the flashed gases, the calorific value of the flashed gases, the refractive index of the flashed gases, the temperature of the cooled second portion of the withdrawn kettle product, and the temperature of the residual liquid from the flashing operation, the amount of reboiling heat being regulated in direct response to the $C_2$ content of the flash vapors.

3. A process for operating a deethanizing still comprising introducing a rich absorption oil containing absorbed $C_2$ hydrocarbons, methane, $C_3$ and higher boiling hydrocarbons into the upper portion of a deethanizing still, removing gaseous effluent overhead from said still as one product of the process, adding reboiling heat to the liquid contents of the kettle section of the still, withdrawing kettle product from the kettle section of said still, dividing this withdrawn material into two portions, removing one portion as the main product of the process, cooling the other portion to a temperature between the limits of —25° F. and 150° F. and sufficient to concentrate said $C_2$ hydrocarbons in the flash vapor subsequently produced, reducing the pressure of the cooled other portion to a pressure of about atmospheric in a flashing operation whereby gases comprising $C_2$ and $C_3$ hydrocarbons are evolved from residual liquid, regulating said cooling of said other portion in direct response to the rate of evolution of gases in said flashing operation to produce said flash vapors at a constant rate and regulating the reboiling heat in direct response to the $C_2$ hydrocarbon content of the flashed gases, the addition of said reboiling heat being sufficient to operate said deethanizing still.

4. A process for operating a still comprising introducing a feed stock comprising a mixture of hydrocarbons of unlike volatilities into a still, removing vaporous effluent as an overhead product of the still, adding reboiling heat to the liquid contents of the kettle section of the still, withdrawing kettle product from said kettle section, dividing the withdrawn kettle product into two portions, removing one portion as a product of the process, lowering the temperature of the other portion of kettle material sufficiently to concentrate a more volatile hydrocarbon of said other portion in flash vapors as subsequently produced and regulating said temperature in direct response to the rate of evolution of said flash vapors to produce said flash vapors at a constant rate, reducing the pressure of the lowered temperature portion of kettle material in a flashing operation to vaporize without decomposition at least a portion of the more easily vaporizable hydrocarbons to produce the aforesaid flash vapors as subsequently produced, and regulating the heat input to said kettle section in direct response to the concentration to the more volatile hydrocarbon content of the flash vapors, the addition of said reboiling heat being sufficient to operate said still.

5. In the process of claim 4, regulating the rate of heat input to the kettle section in response to the specific gravity of the flash vapors.

6. In the process of claim 4, regulating the rate of heat input to the kettle section in response to the calorific value of the flashed vapors.

7. In the process of claim 4, regulating the rate of heat input to the kettle section in response to the refractive index of the flashed vapors.

8. A process for operating a deethanizing absorber comprising introducing a rich absorption oil containing absorbed $C_2$ hydrocarbons, methane, $C_3$ and higher boiling hydrocarbons into a deethanizing absorber, introducing lean absorption oil into the top of the absorber, removing a vaporous product from the top of the absorber as one product of the process, adding reboiling heat to the kettle section of the deethanizing absorber, withdrawing kettle material from the kettle section, dividing the withdrawn kettle material into two portions, withdrawing one portion from the process as a main product, cooling the other portion of withdrawn kettle material sufficiently to concentrate said $C_2$ hydrocarbons in flash vapors as subsequently produced, reducing the pressure of the cooled other portion of withdrawn material in a flashing operation to produce said flash vapors, regulating the degree of cooling of said other portion of kettle material in direct response to the rate of evolution of said flash vapors and in an amount sufficient to produce said flash vapors at a predetermined constant rate and regulating the heat input to the kettle section of said deethanizing absorber in direct response to the specific gravity of the flashed vapors, said heat input to said kettle section being sufficient to promote operation of said deethanizing absorber.

9. In the process of claim 8 regulating the heat input to the kettle section in direct response to the calorific value of the flashed vapors.

10. In the process of claim 8, regulating the heat input to the kettle section in direct response to the refractive index of the flashed vapors.

References Cited in the file of this patent

UNITED STATES PATENTS

| 2,467,174 | Wilson | Apr. 12, 1949 |
| 2,529,030 | Latchum | Nov. 7, 1950 |
| 2,547,970 | Phillips et al. | Apr. 10, 1951 |
| 2,564,791 | Ribble | Aug. 21, 1951 |
| 2,638,437 | Ragatz | May 12, 1953 |